(12) United States Patent
Kawamori et al.

(10) Patent No.: US 11,097,321 B2
(45) Date of Patent: Aug. 24, 2021

(54) CLEANING MACHINE

(71) Applicant: SUGINO MACHINE LIMITED, Uozu (JP)

(72) Inventors: Yoshiteru Kawamori, Uozu (JP); Toyoaki Mitsue, Uozu (JP); Takuya Kanemoto, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 0 days.

(21) Appl. No.: 17/060,310

(22) Filed: Oct. 1, 2020

(65) Prior Publication Data
US 2021/0101190 A1 Apr. 8, 2021

(30) Foreign Application Priority Data

Oct. 8, 2019 (JP) .............................. JP2019-185493

(51) Int. Cl.
  *B08B 13/00* (2006.01)
  *B08B 3/02* (2006.01)
  (Continued)

(52) U.S. Cl.
  CPC ............... *B08B 13/00* (2013.01); *B08B 3/02* (2013.01); *B08B 5/02* (2013.01); *B23Q 3/069* (2013.01); *B23Q 3/08* (2013.01); *B23Q 2703/04* (2013.01)

(58) Field of Classification Search
  CPC .. B08B 13/00; B08B 3/02; B08B 5/02; B23Q 3/069; B23Q 3/08; B23Q 2703/04
  See application file for complete search history.

(56) References Cited

U.S. PATENT DOCUMENTS

2001/0044266 A1* 11/2001 Katsuoka .............. B24B 41/061
  451/66
2017/0343084 A1* 11/2017 Haremaki ............. F16H 57/027
  (Continued)

FOREIGN PATENT DOCUMENTS

JP    2012-52604 A    3/2012
JP    2014-151280 A   8/2014
  (Continued)

OTHER PUBLICATIONS

JPO, "Japanese Office Action for JP Application No. 2019-185493", Japan, dated Jun. 15, 2020.
  (Continued)

*Primary Examiner* — Benjamin L Osterhout
(74) *Attorney, Agent, or Firm* — Tim Tingkang Xia, Esq.; Locke Lord LLP (57) ABSTRACT

The present disclosure provides a cleaning machine that simplifies the structure around a turn table. The cleaning machine (10) of the present disclosure comprises a cleaning table (31), a rotation mechanism (40), and a first flow path (5a~5e). The rotation mechanism includes a motor (42), a first bevel gear (44), a reducer (50) having an output shaft (52) and an input shaft (51), a second bevel gear (56), a first swivel housing (60) inserted into the input shaft (51), a first swivel shaft (61) arranged inside the first swivel housing, and a first flange (62). The first flow path includes a first annular path (63a~63e), a first upstream flow path (64a~64e), and a first downstream flow path (65a~65e) arranged inside the first swivel shaft and connected to the first upstream flow path via the first annular path.

9 Claims, 6 Drawing Sheets

(51) Int. Cl.
*B08B 5/02* (2006.01)
*B23Q 3/06* (2006.01)
*B23Q 3/08* (2006.01)

(56) References Cited

U.S. PATENT DOCUMENTS

2020/0108424 A1* 4/2020 Kunitomo ............... B08B 13/00
2020/0246842 A1* 8/2020 Mitsue .................... B08B 3/04
2021/0001379 A1* 1/2021 Kawamori ............... F26B 5/00

FOREIGN PATENT DOCUMENTS

JP      6008753 B2    10/2016
JP    2017-209627 A   11/2017

OTHER PUBLICATIONS

JPO, "Decision to Grant a Patent for JP Application No. 2019-185493", dated Japan, Jul. 30, 2020.

* cited by examiner

CLEANING MACHINE

CROSS REFERENCE TO RELATED APPLICATION

This application claims priority to and the benefit of Japanese Patent Application No. 2019-185493, filed on Oct. 8, 2019, entitled "Cleaning Machine and Table Rotating Device", which is incorporated herein by reference in its entirety.

FIELD OF THE DISCLOSURE

The present disclosure relates to a cleaning machine.

BACKGROUND OF THE DISCLOSURE

A known cleaning machine includes: a turret head with a nozzle, a turn table arranged with a plurality of fixed parts for fixing a workpiece, and a cleaning chamber with a loading/unloading space and a cleaning space. The fixed parts arranged in the loading/unloading space are moved to the cleaning space, and the fixed parts arranged in the cleaning space are moved to the loading/unloading space by rotating the turn table.

SUMMARY OF THE DISCLOSURE

In the above-mentioned conventional cleaning machine, it is possible to perform cleaning by tilting the workpiece, which is the object to be cleaned, by a tilting mechanism provided on the turn table, but the actual situation is to simplify the structure around the turn table.

In view of the above-mentioned actual situation, the first purpose of the present disclosure is to provide a cleaning machine that can simplify the structure around the turn table, and the second purpose of the present disclosure is to provide a cleaning machine which includes a new posture changing device and does not include a turn table.

The present disclosure proposes a cleaning machine for cleaning an object, including: a turn table which rotates around a rotation axis to turn the object to a predetermined position; and a posture changing device arranged on the turn table to change the posture of the object, the posture changing device including: a cleaning table on which the object is placed; a rotation mechanism, which is arranged on one end of the cleaning table so as to make the cleaning table rotate around a table rotation axis orthogonal to the rotation axis; and at least one first flow path for supplying a first fluid to the cleaning table, the rotation mechanism including: a motor configured to serve as a driving source; a first bevel gear fixed to a driving shaft of the motor; a reducer having: a hollow output shaft arranged on the same axis as the table rotation axis, and a hollow input shaft arranged inside the output shaft; a second bevel gear fixed to the input shaft and engaged with the first bevel gear; a hollow first swivel housing, which is inserted into the input shaft; a first swivel shaft arranged to be rotatable around the table rotation axis inside the first swivel housing; and a first flange, one end surface of which is fixed to the first swivel shaft and the output shaft, and the other end surface of which is fixed to one end of the cleaning table, the at least one first flow path including: a first annular path formed in an annular shape between the first swivel shaft and an inner peripheral surface of the first swivel housing; a first upstream flow path arranged upstream of the first annular path; and a first downstream flow path, which is arranged downstream of the first annular path and located inside the first swivel shaft, and is connected to the first upstream flow path via the first annular path. The present disclosure further proposes a cleaning machine which includes, for example, the above-mentioned new posture changing device and does not include a turn table.

The rotation mechanism may be a rotary table. The number of first flow path may be one or more. Preferably, a plurality of first flow paths is arranged. The number of the first annular path, the first upstream flow path, the first downstream flow path, and the air supply ports are the same. The first upstream flow path, the first annular path, and the first downstream flow path are respectively connected to a compressed air supply source and an air supply port. The first upstream flow path extends along the table rotation axis inside the first swivel housing. The first downstream flow path is arranged inside the first swivel shaft and extends along the table rotation axis.

The number of second flow path may be one or more. Preferably, one second flow path is provided. The second flow path can be branched into multiple branches on the side of the cleaning table. The plurality of branched second flow paths are connected to a plurality of cleaning nozzles. The second downstream flow path is arranged inside the second swivel shaft and extends along the table rotation axis.

Preferably, the cleaning table includes a clamping device. The clamping device includes a clamper. The clamper contacts the object and presses the object toward the seating pin.

The cleaning nozzles can be arranged near the clamping device. The nozzles can clean around the clamper. The cleaning nozzles may be configured to cause the jet flow of the cleaning liquid to impact the contact portion between the object and the clamper. The cleaning nozzles generate the jet flow of cleaning liquid toward the vicinity of the contact position between the seating pins or the positioning pins and the object.

The present disclosure further proposes an object cleaning method. Preferably, an object is fixed to a cleaning table in a transport station and the object is cleaned in a cleaning station. Before placing the object on the cleaning table in the transport station, a first nozzle arranged in the cleaning station sprays cleaning liquid on the contact position between the object and the cleaning table. A clamping device fixes the object to the cleaning table. The cleaning table is rotated around a rotation axis to transport the object to the cleaning station. The second nozzle arranged in the cleaning station cleans the object in the cleaning station.

Preferably, the cleaning method further includes that a third nozzle arranged in the cleaning station sprays compressed air on the object before the object is placed on the cleaning table in the transport station. For example, the third nozzle is in contact with the object when the object is placed on the cleaning table. The third nozzle is blocked by the object when the object is provided. The third nozzle can be used as a seating nozzle.

According to the present disclosure, the structure around the turn table of the cleaning machine can be simplified. In addition, problems, structures, and effects other than the above can be clarified by the following embodiments.

DESCRIPTION OF COMPONENT MARK NUMBERS

3 Object,
5a~5e Air flow path (first flow path),
10 Cleaning machine,
21, 22 Table rotation axis (rotation axis),
30 Posture changing device,
31 Cleaning table,
40 Rotation mechanism (table rotating device),
41 Motor rotating shaft,
42 Motor,
43 Driving shaft,
44 Bevel gear (first bevel gear),
50 Reducer,
51 Input shaft,
52 Output shaft,
56 Bevel gear (second bevel gear),
60 Swivel housing (first swivel housing),
61 Swivel shaft (first swivel shaft),
62 Flange (first flange),
63a~63e Annular path (first annular path),
64a~64e Upstream flow path (first upstream flow path),
65a~65e Downstream flow path (second downstream flow path),
74 Flange (second flange),
81 Rotation axis, and
82 Turn table.

DETAILED DESCRIPTION OF THE PREFERRED EMBODIMENTS

Figure 1:
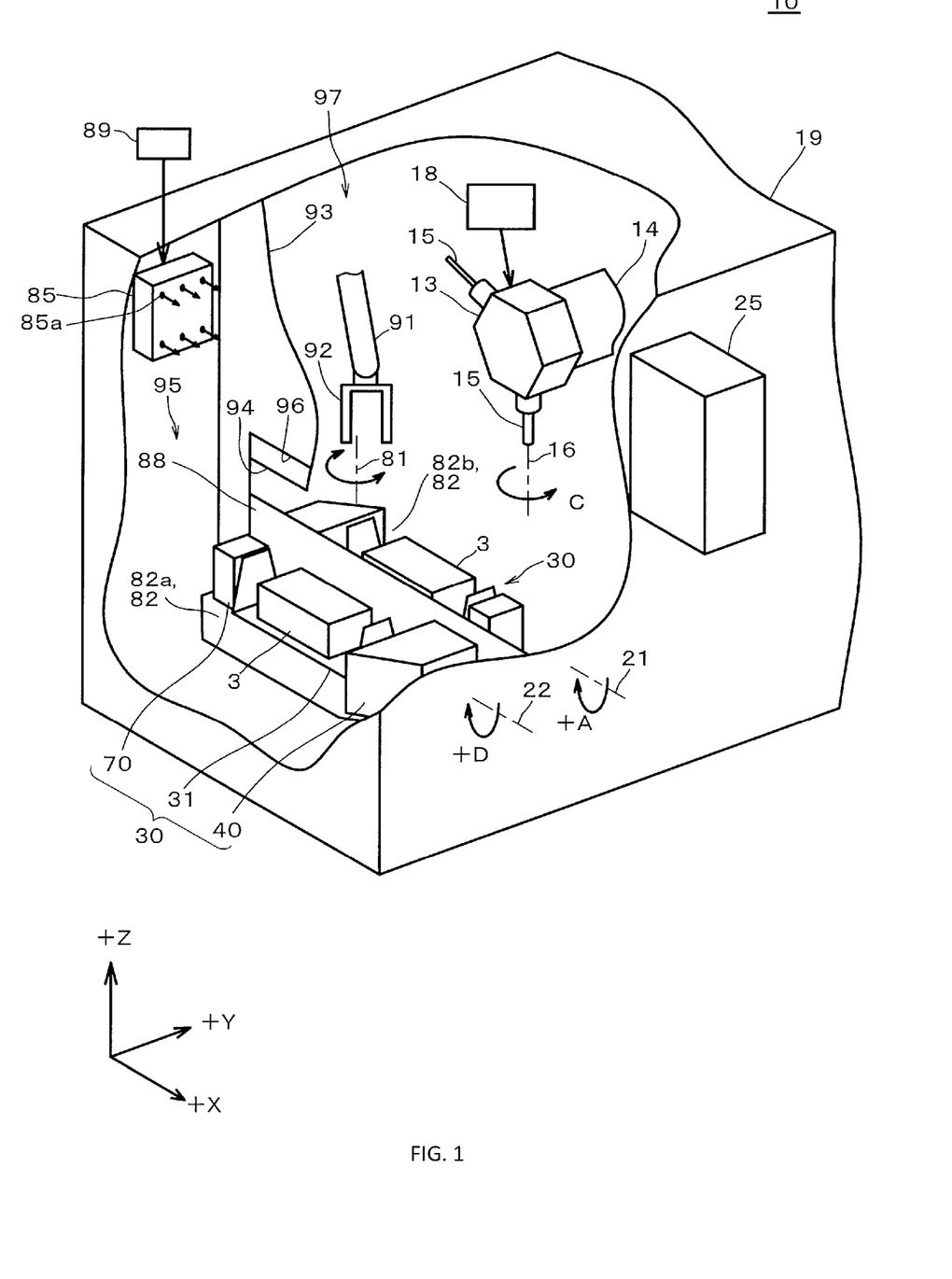
FIG. 1 is a perspective view of a cleaning machine according to an embodiment of the present disclosure.
Figure 2:
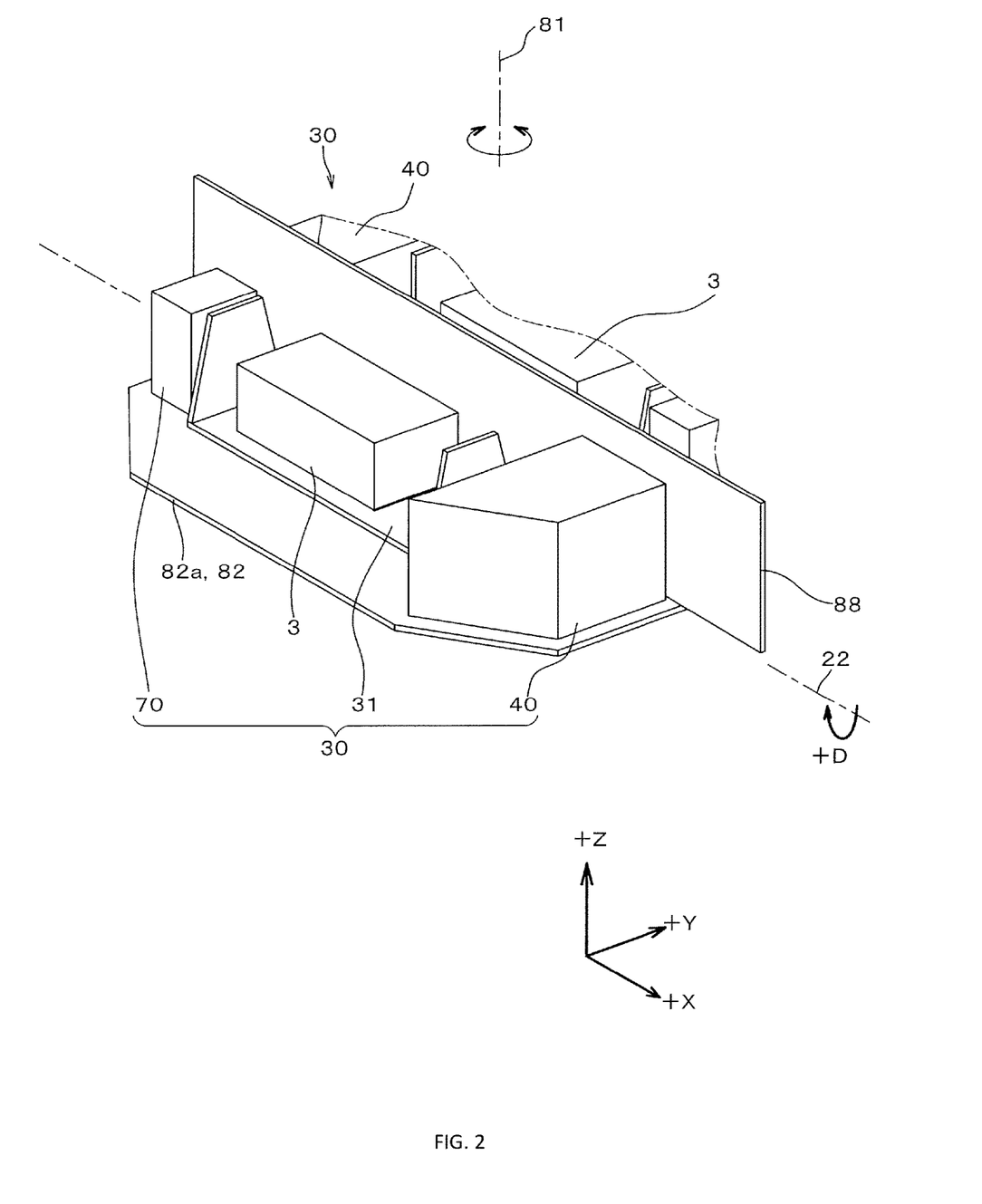
FIG. 2 is a perspective view of a turn table.
Figure 3:
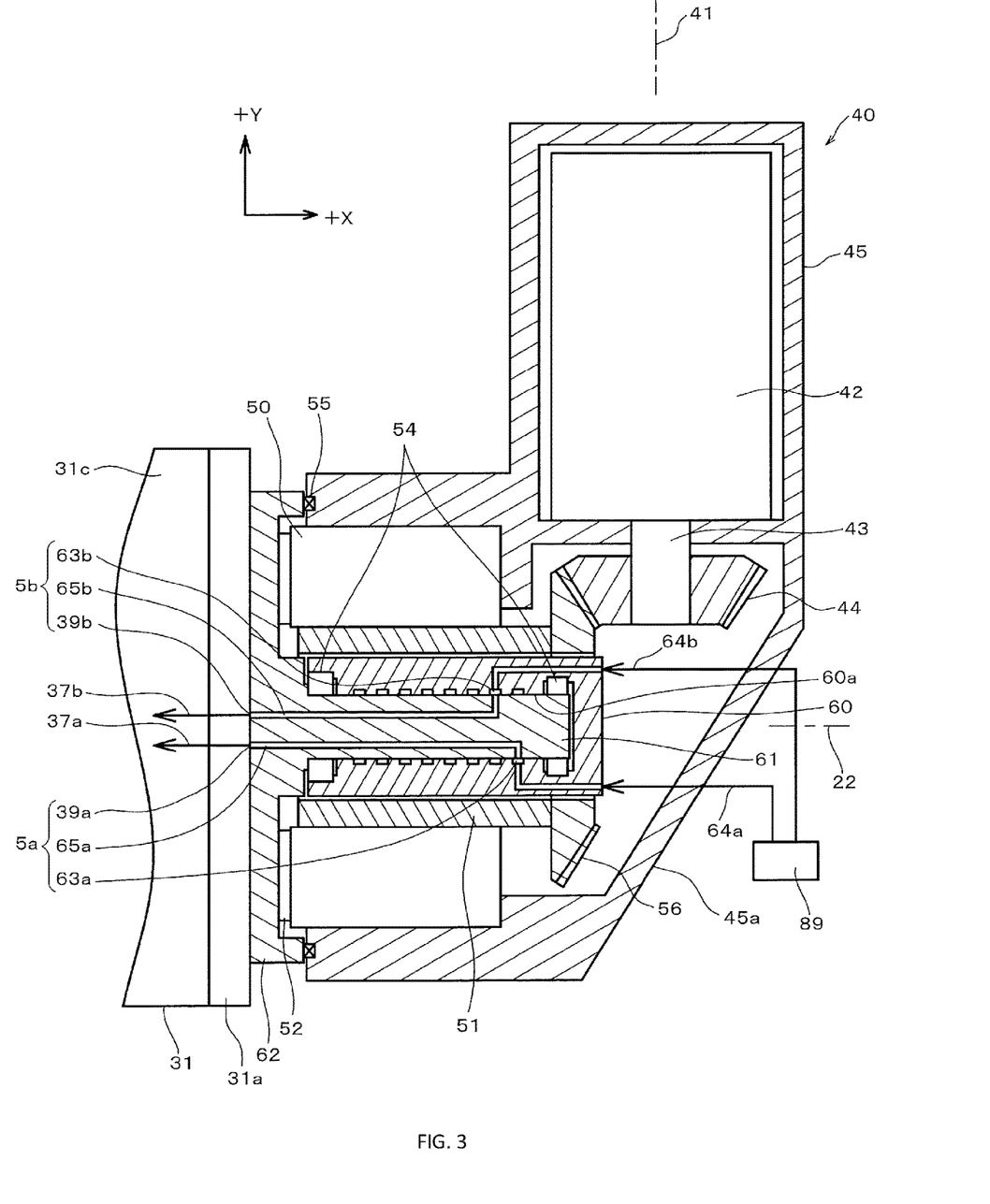
FIG. 3 is a cross-sectional view obtained by cutting a part of a rotation mechanism with an XY plane.
Figure 4:
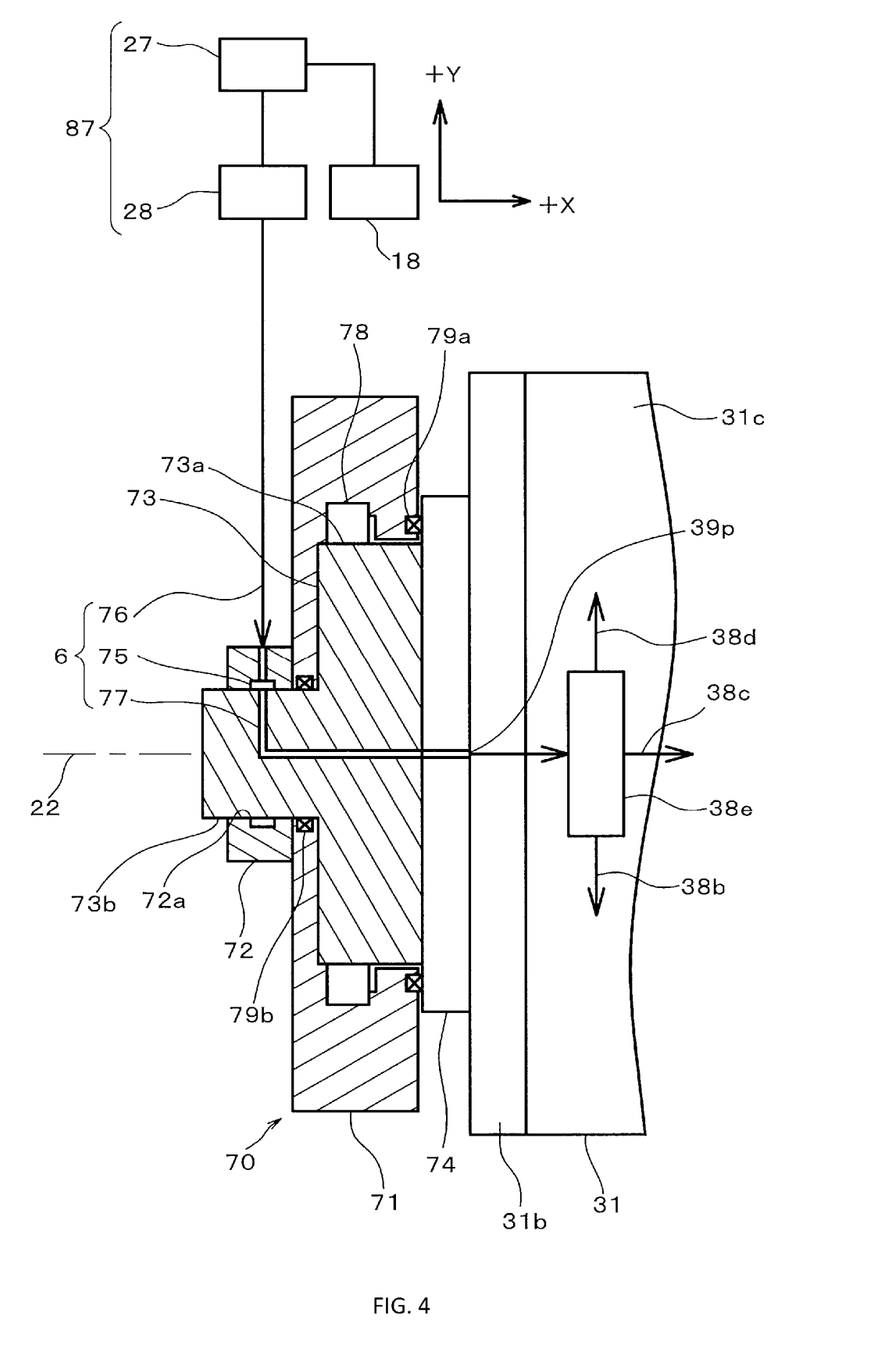
FIG. 4 is a cross-sectional view obtained by cutting a portion of a tail stock with the XY plane.
Figure 5:
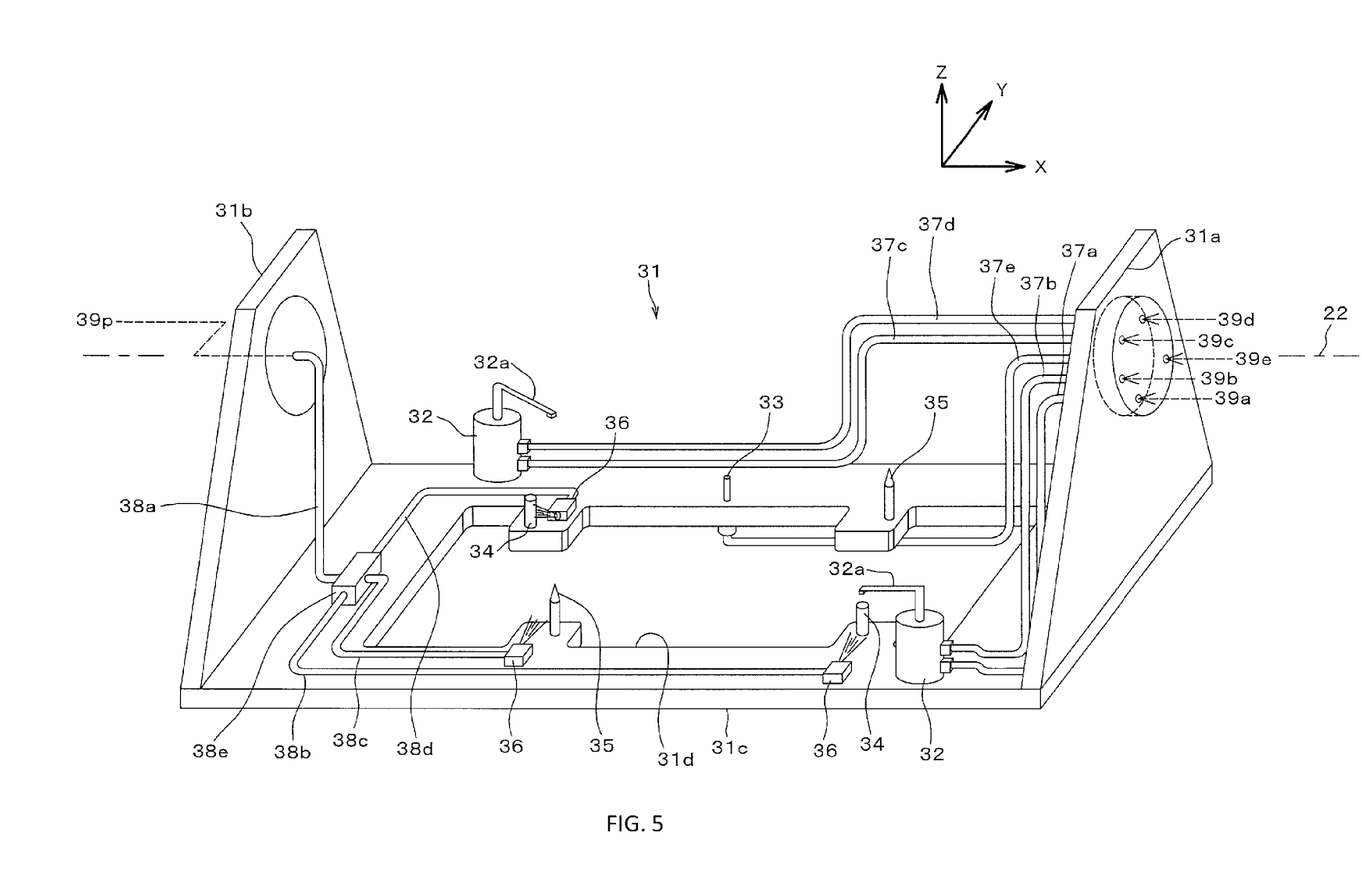
FIG. 5 is a perspective view of a cleaning table.

Hereinafter, embodiments of a cleaning machine according to the present disclosure will be described with reference to the drawings. FIG. 1 is a perspective view of a cleaning machine 10 according to this embodiment. FIG. 2 is a perspective view including main parts of a turn table 82 shown in FIG. 1. FIG. 3 is a cross-sectional view obtained by cutting main parts including a rotation mechanism 40 shown in FIG. 1 using an XY plane including a table rotation axis 22. FIG. 4 is a cross-sectional view obtained by cutting main parts including a tail stock 70 shown in FIG. 1 using the XY plane including the table rotation axis 22. FIG. 5 is a perspective view showing details of a cleaning table 31 shown in FIG. 1.

As shown in FIG. 1, the cleaning machine 10 includes a cleaning chamber 19, a partition wall 93, a turn table 82, a posture changing device 30, a nozzle moving device 14, nozzles 15, and a control device 25. In addition, the cleaning machine 10 may include an intermediate shutter 94, a blower 85, a robot moving device 91, a turret 13, a first pump 18, a second pump 28, a cleaning liquid tank 27 (see FIG. 4), and a compressed air supply source 89.

The cleaning chamber 19 is, for example, a box. The cleaning chamber 19 includes a transport station 95 at the front and a cleaning station 97 at the rear. The nozzles 15 and the nozzle moving device 14 are arranged in the cleaning station 97.

The turn table 82 is arranged across the cleaning station 97 and the transport station 95. The turn table 82 includes two areas 82a and 82b, and a movable wall 88. The movable wall 88 divides the turn table 82 into two areas 82a and 82b. The turn table 82 turns 180 degrees around a rotation axis 81. The rotation axis 81 extends in a vertical direction (Z-axis direction) on a boundary between the cleaning station 97 and the transport station 95.

The areas 82a and 82b have 180-degree rotation symmetry with the rotation axis 81. By turning the turn table 82, one of the two areas 82a and 82b is positioned in the cleaning station 97, and the other is positioned in the transport station 95. As a result, an object 3 placed on each of the areas 82a, 82b of the turn table is turned to a predetermined position (a transport position or a cleaning position).

The movable wall 88 is a flat plate. The movable wall 88 is fixed to the turn table 82 on a surface that includes the rotation axis 81 and is perpendicular to the turn table 82. When the turn table 82 is positioned, the movable wall 88 is connected to the partition wall 93, and the movable wall 88 and the partition wall 93 become the same plane. The movable wall 88 and the turn table 82 are integrated and turned around the rotation axis 81.

The partition wall 93 is a flat plate. The partition wall 93 is arranged on the XZ plane including the rotation axis 81 in the cleaning chamber 19, and divides the cleaning chamber 19 into the cleaning station 97 and the transport station 95. The partition wall 93 includes a transport port 96. When the turn table 82 turns, the turn table 82, the cleaning table 31, and the object 3 pass through the transport port 96.

The intermediate shutter 94 opens and closes the transport port 96. For example, the intermediate shutter 94 is a sliding gate that slides up and down. When the intermediate shutter 94 descends, the intermediate shutter 94 comes into contact with the movable wall 88. When the intermediate shutter 94 comes into contact with the movable wall 88, the transport port 96 is closed.

The transport station 95 includes a loading port (not shown). The loading port is arranged on the front surface or the upper surface of the cleaning machine 10, for example. A loading port includes, for example, a loading shutter (not shown) including the sliding gate, and the loading port is opened and closed by ascending and descending operations of the loading shutter.

The first pump 18 is a liquid pump, such as a high-pressure piston pump, a gear pump, or a centrifugal pump. The cleaning liquid tank 27 stores the cleaning liquid (second fluid) and supplies the cleaning liquid to the first pump 18. The first pump 18 supplies the cleaning liquid to the nozzle 15 via the turret 13.

The nozzle moving device 14 can freely move the turret 13 and the nozzle 15 in the left-right direction (X-axis direction), front-rear direction (Y-axis direction), and up-down direction (Z-axis direction) relative to the cleaning table 31.

A rotation mechanism 40 causes the cleaning table 31 to rotate around the table rotation axis 21 (table rotation axis 22) along an A-axis direction (D-axis direction).

The turret 13 is disposed on the nozzle moving device 14. The turret 13 has a nozzle rotation axis 16 extending along a Z-axis direction. The turret 13 may include a plurality of nozzles 15. The turret 13 is rotated to turn one nozzle 15 to the lower. The turret 13 supplies the cleaning fluid to the nozzle 15 that is turned to the lower. The nozzle moving device 14 or the turret 13 causes the nozzles 15 to rotate around the nozzle rotation axis 16 along a C-axis direction.

The nozzle 15 is disposed on the turret 13. For example, the nozzle 15 includes a shaft body (not shown) extending along the nozzle rotation axis 16, and a nozzle hole (not shown) disposed at the top of the shaft body. Preferably, the nozzle 15 may rotate around the nozzle rotation axis 16 or be positioned in a direction of rotating.

The blower 85 includes a plurality of blowing nozzles 85a. The compressed air supply source 89 is, for example, an air compressor or a blower. The compressed air supply source 89 is connected with the blower 85.

The robot moving device 91 is, for example, a multi-joint robot. The robot moving device 91 is disposed on the top surface of the cleaning chamber 19. The robot moving device 91 is disposed at the transport station 95. The robot moving device 91 includes a gripper 92 configured to grip the object 3 at the top. The robot moving device 91 takes out the object 3 gripped by the gripper 92 from the loading port (not shown), or puts the object 3 gripped by the gripper 92 into the loading port. In addition, the robot moving device 91 moves the object 3 toward the blower 85 to dry the object 3 while changing the posture of the object 3.

The control device 25 controls the nozzle moving device 14, the turret 13, the turn table 82, the robot moving device 91, the posture changing device 30, the first pump 18, the second pump 28, the intermediate shutter 94, the compressed air supply source 89, and the blower 85.

Although not shown, the control device 25 includes hardware and software. The hardware includes a CPU that executes various operations, a storage device, such as a ROM or HDD, that stores programs for the CPU to perform operations, RAM used as the work area when the CPU executes the program, and a communication interface used as an interface when sending and receiving data to/from other devices. The software is stored in the storage device and executed by the CPU. The functions of the control device 25 are implemented by the CPU loading various programs stored in the storage device into the RAM for execution.

The posture changing device 30 will be described in the following. As shown in FIG. 1, the posture changing device 30 is respectively arranged in each of the areas 82a, 82b of the turn table 82 to change the posture of the object 3. Hereinafter, the posture changing device 30 arranged in the area 82a will be described.

The posture changing device 30 includes a cleaning table 31, a rotation mechanism (e.g. a table rotating device) 40 and a tail stock 70. In addition, the posture changing device 30 includes a plurality of air flow paths and a cleaning liquid flow path 6 (refer to FIG. 4). In this embodiment, eight air flow paths are provided, but only two air flow paths 5a and 5b are shown in FIG. 3, and the other air flow paths are omitted.

The rotation mechanism 40 is arranged on one end of the upper surface of the turn table 82. The rotation mechanism 40 may be a rotary table. The rotation mechanism 40 causes the cleaning table 31 to rotate around a table rotation axis (rotation axis) 22 perpendicular to the rotation axis 81. As shown in FIG. 3, the rotation mechanism 40 includes a motor 42, a bevel gear (first bevel gear) 44, a reducer 50, a bevel gear (second bevel gear) 56, a swivel housing (first swivel housing) 60, a swivel shaft (first swivel shaft) 61, a flange (first flange) 62, and a case 45.

The motor 42 is a driving source and includes a driving shaft 43. The motor 42 is fixed to the case 45. The motor 42 is, for example, a servo motor or a stepping motor. The driving shaft 43 is orthogonal to the table rotation axis 22 in the XY plane. That is, the table rotation axis 22 extends along the X-axis direction, while the driving shaft 43 extends along the Y-axis direction. In addition, the driving shaft 43 and the table rotation axis 22 may not intersect with each other.

The bevel gear 44 is fixed to the driving shaft 43. The reducer 50 is a final reducer, and the backlash is preferably zero. The reducer 50 is fixed to the case 45. The reducer 50 includes a hollow output shaft 52 and a hollow input shaft 51. The output shaft 52 and the input shaft 51 are arranged on the same axis as the table rotation axis 22. The input shaft 51 is arranged inside the output shaft 52.

The bevel gear 56 is fixed to the input shaft 51 and is engaged with the bevel gear 44.

The swivel housing 60 has a hollow cylindrical shape and is inserted into the input shaft 51. The swivel housing 60 is arranged on the same axis as the table rotation axis 22. The swivel housing 60 is fixed to the case 45.

The swivel shaft 61 is arranged on the same axis as the table rotation axis 22 inside the swivel housing 60. Both ends of the swivel shaft 61 are supported by bearings 54 and the swivel shaft 61 is fixed to the flange 62. The swivel shaft 61 can rotate around the table rotation axis 22.

The flange 62 has a disk shape, one end surface of the flange 62 is fixed to the swivel shaft 61 and the output shaft 52, and the other end surface of the flange 62 is fixed to a right side plate (a first side plate) 31a that is one end of the cleaning table 31. In addition, in the present embodiment, the flange 62 and the swivel shaft 61 are constituted by an integral member, but the flange 62 and the swivel shaft 61 may be constituted separately and fixed to each other by a fixing member not shown.

The case 45 is box-shaped and covers the motor 42, the bevel gear 44, the bevel gear 56, and the reducer 50 as a whole. A portion of the case 45 covering the bevel gear 44 and the bevel gear 56 is comprised of an inclined surface 45a. Specifically, the case 45 is formed in an inverted L shape in the XY plane, and is formed with an inclined surface 45a that is tapered at the top in a manner that follows the shape of the bevel gear 44 and the bevel gear 56 at the top side (which is closer to the top side than the driving shaft 43 of the motor 42). In addition, a seal ring 55 is arranged between the flange 62 and the case 45.

The air flow paths (first flow paths) 5a, 5b, . . . 5e supply compressed air (first fluid) to the cleaning table 31. The air flow path (hereinafter referred to as flow path) 5a includes an annular path (first annular path) 63a, an upstream flow path (first upstream flow path) 64a, a downstream flow path (first downstream flow path) 65a and an air supply port 39a. The upstream flow path 64a is connected to a compressed air supply source 89. Part of the illustration is omitted, but the annular paths 63a, 63b . . . , the upstream flow paths 64a, 64b . . . , the downstream flow paths 65a, 65b . . . , and the air supply ports 39a, 39b . . . have the same number, and each flow path 5b, 5c, 5d . . . has the same structure as the flow path 5a. Hereinafter, the flow path 5a will be described in detail.

An annular path 63a is formed between the inner peripheral surface 60a of the swivel housing 60 and the swivel shaft 61. The annular path 63a may also be arranged on the outer circumferential surface of the swivel shaft 61.

The upstream flow path 64a is arranged in the swivel housing 60. The upstream flow path 64a connects the compressed air supply source 89 and the annular path 63a. The upstream flow path 64a may include a pipe.

The downstream flow path 65a is arranged inside the swivel shaft 61 and the flange 62. The downstream flow path 65a extends along the table rotation axis 22. The downstream flow path 65*a* is connected to the upstream flow path 64*a* via the annular path 63*a*. The downstream flow path 65*a* connects the annular path 63*a* and the air supply port 39*a*. The air supply port 39*a* is arranged at the other end of the flange 62.

The compressed air supplied from the compressed air supply source 89 sequentially flows through the upstream flow path 64*a*, the annular path 63*a*, and the downstream flow path 65*a*, and is guided to the air supply port 39*a*. The compressed air also flows in the flow paths 5*b*, 5*c* . . . in the same way.

The tail stock 70 is arranged at the other end of the cleaning table 31, and supports the cleaning table 31 in a rotatable manner. As shown in FIG. 4, the tail stock 70 includes a bracket 71, a swivel housing (second swivel housing) 72, a swivel shaft (second swivel shaft) 73, and a flange (second flange) 74. The tail stock 70 may include seal rings 79*a*, 79*b*.

The bracket 71 is fixed to the other end of the upper surface of the turn table 82. The bracket 71 includes a bearing 78. The bearing 78 is arranged with the table rotation axis 22 as a center.

The swivel housing 72 is fixed to the bracket 71 and arranged on the same axis as the table rotation axis 22.

The swivel shaft 73 is arranged on the same axis as the table rotation axis 22 inside the swivel housing 72. The swivel shaft 73 has a large diameter portion 73*a* supported by the bearing 78 and a small diameter portion 73*b* inserted into the swivel housing 72. The swivel shaft 73 is supported by the bearing 78 and can rotate around the table rotation axis 22.

The flange 74 is a disc-shaped member and is fixed to the swivel shaft 73. The other end surface of the flange 74 is fixed to a left side plate (second side plate) 31*b* that is the other end side of the cleaning table 31. The flange 74 and the swivel shaft 73 may be formed integrally.

The seal ring 79*a* is arranged at one end of the bracket 71 to close the gap between the flange 74 or the swivel shaft 73 and the bracket 71. The seal ring 79*b* is arranged at the other end of the bracket 71 to close the gap between the swivel shaft 73 and the bracket 71.

The cleaning liquid supply source 87 contains a cleaning liquid tank 27 in which the cleaning liquid is stored and a second pump 28. The second pump 28 is, for example, a centrifugal pump for low pressure.

The cleaning liquid flow path (second flow path) 6 supplies the cleaning liquid (second fluid) to the cleaning table 31. The cleaning liquid flow path (hereinafter referred to flow path) 6 includes an annular path (second annular path) 75, an upstream flow path (second upstream flow path) 76, and a downstream flow path 77 (second downstream flow path), and cleaning liquid supply port 39*p*. In the flow path 6, there is one annular path 75, one upstream flow path 76, and one downstream flow path 77. Multiple flow paths 6 may also be provided.

The annular path 75 is formed between the inner peripheral surface 72*a* of the swivel housing 72 and the swivel shaft 73. The annular path 75 may be provided on the outer circumferential surface of the swivel shaft 73.

The upstream flow path 76 is arranged for the swivel housing 72, and connects the second pump 28 to the annular path 75. The upstream flow path 76 may include a pipe.

The downstream flow path 77 is arranged inside the swivel shaft 73 and the flange 74. The downstream flow path 77 extends in a direction along the table rotation axis 22. The downstream flow path 77 is connected with the upstream flow path 76 via the annular path 75. The downstream flow path 77 connects the annular path 75 to the cleaning liquid supply port 39*p*. The cleaning liquid supply port 39*p* is arranged at one end of the flange 74.

The cleaning liquid supplied from the second pump 28 sequentially flows through the upstream flow path 76, the annular path 75, and the downstream flow path 77, and is guided to the cleaning liquid supply port 39*p*.

The object 3 is placed on the cleaning table 31. As shown in FIG. 5, the cleaning table 31 includes a right side plate 31*a* on one end, a left side plate 31*b* on the other end, and a bottom plate 31*c* connecting a lower part of the right side plate 31*a* and a lower part of the left side plate 31*b*. The cleaning table 31 may include a seating pin(s) 34, a clamping device 32, a seating detection nozzle 33, a cleaning nozzle 36, and a positioning pin(s) 35.

The bottom plate 31*c* has an opening 31*d*. The opening 31*d* is formed in the center of the bottom plate 31*c*. The opening 31*d* exposes the object 3 to the opposite surface of the bottom plate 31*c*. When the nozzle 15 makes the jet flow impact the object 3 from the back surface (lower side in FIG. 5) of the object 3 on the bottom plate 31*c*, the jet flow passes through the opening 31*d* and reaches the object 3.

Two seating pins 34, the clamping device 32, the seating detection nozzle 33, three cleaning nozzles 36, and two positioning pins 35 are arranged around the opening 31*d* on the bottom plate 31*c*.

The seating pins 34 are formed in a cylindrical shape, and the object 3 is placed on their upper surfaces. That is, the seating pins 34 position the object 3 in the Z direction.

The clamping device 32 includes a clamper 32*a* that holds the object 3 placed on the seating pins 34. The clamping device 32 and the air supply port 39*a* are connected via an air flow path (first air flow path) 37*a*. The compressed air supplied from the compressed air supply source 89 flows to the air flow path 37*a* via the air supply port 39*a* of the flow path 5*a* (see FIG. 3), and is supplied to the clamping device 32. The clamping device 32 is operated by the supplied compressed air, and the clamper 32*a* holds the object 3 or releases the object 3. The same applies to the air supply ports 39*b* to 39*d* and the air flow paths 37*b* to 37*d*.

The seating detection nozzle 33 detects whether the object 3 is placed on the seating pin 34. The seating detection nozzle 33 and the air supply port 39*e* are connected via an air flow path (second air flow path) 37*e*. The compressed air supplied from the compressed air supply source 89 flows to the air flow path 37*e* via the air supply port 39*e* of the flow path 5*e*, and is supplied to the seating detection nozzle 33. In a state where the object 3 is placed on the seating pins 34, the seating detection nozzle 33 is blocked by the object 3, so the compressed air cannot be discharged from the seating detection nozzle 33, and pressure is generated in the air flow path 37*e*. On the other hand, in a state where the object 3 is not placed on the seating pins 34, the seating detection nozzle 33 is not blocked by the object 3, and no pressure is generated in the air flow path 37*e*.

A pressure switch (not shown) is provided in the air flow path 37*e*, and the pressure switch detects the pressure of the air flow path 37*e*. When the pressure of the air flow path 37*e* exceeds a predetermined pressure, the pressure switch operates to output a signal. The control device 25 determines whether or not the object 3 is placed on the seating pins 34 based on the signal from the pressure switch.

The positioning pins 35 position the object 3 in the XY direction.

Each cleaning nozzles 36 has a nozzle hole, and sprays the cleaning liquid from the nozzle hole to the object 3, the seating pins 34 or the positioning pins 35, and the clamper 32a. The cleaning nozzles 36 are arranged in proximity to the clamping device 32, the seating pins 34 or the positioning pins 35.

The cleaning liquid flow paths 38a, 38b, 38c, and 38d connect each of the cleaning nozzles 36 to the cleaning liquid supply port 39p. A manifold 38e connects the cleaning liquid flow path 38a to three cleaning liquid flow paths 38b, 38c, and 38d.

The cleaning liquid supplied from the cleaning liquid supply source 87 flows from the flow path 6 (refer to FIG. 4) to the cleaning liquid flow paths 38a to 38d via the cleaning liquid supply port 39p, and then is sprayed from the nozzle hole of each cleaning nozzles 36 to the object 3, the clamper 32a, and the seating pins 34 or the positioning pins 35.

Figure 6:
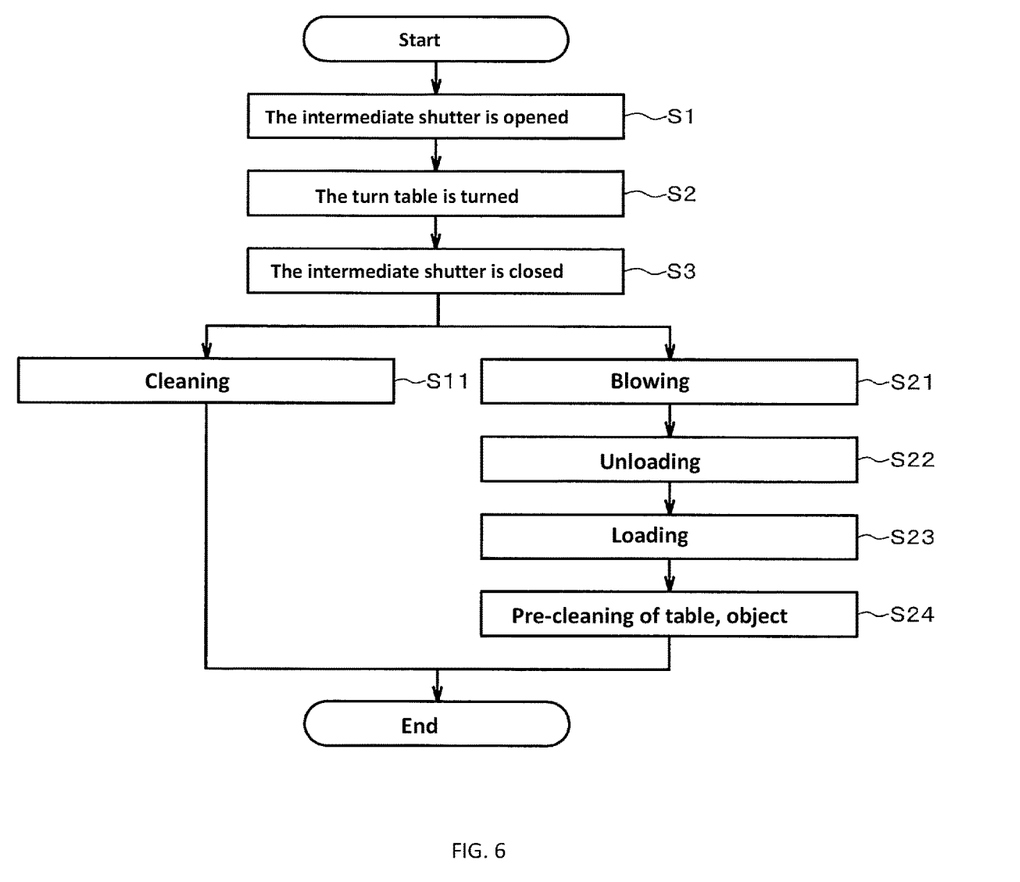
FIG. 6 is a view showing a cleaning process in this embodiment.

The present disclosure further proposes a method of cleaning the object 3 by the cleaning machine 10, which will be described in the following. FIG. 6 shows a cleaning process in this embodiment. In addition, the following operations are executed based on a control command from the control device 25.

As shown in FIG. 6, first, the intermediate shutter 94 is opened (S1). Then the turn table 82 is turned (S2). At this time, the object 3 before cleaning at the transport station 95 is transported to the cleaning station 97, and the cleaned object 3 at the cleaning station 97 is transported to the transport station 95. Then, the intermediate shutter 94 is closed (S3). At this time, the cleaning station 97 and the transport station 95 are separated by the partition wall 93, the intermediate shutter 94, and the movable wall 88.

The present disclosure further proposes a cleaning method for the cleaning station 97, which will be described in the following.

The first pump 18 supplies the cleaning liquid to the nozzle (second nozzle) 15, and the nozzle 15 sprays the cleaning liquid. The rotation mechanism 40 changes the posture of the object 3, the nozzle moving device 14 moves the nozzle 15, and the nozzle 15 causes the jet flow to impact the object 3. The nozzle 15 moves along the movement path so as to clean the object 3 (S11).

The operations of drying and transport in the transport station 95 will be described in the following.

The clamping device 32 loosens the object 3 by compressed air supplied from the compressed air supply source 89. The robot moving device 91 grips (clamps) the cleaned object 3 and moves it toward the blower 85. The blower 85 sprays the compressed air to the object 3 to blow (S21).

The loading shutter (not shown) opens the loading port (not shown). The robot moving device 91 unloads the dried object 3 from a loading port (not shown) (S22).

Then, the robot moving device 91 loads the object 3 to be cleaned next from the loading port (not shown) (S23). The robot moving device 91 maintains the object 3 in a state slightly separated from the seating pins 34 by a gap. In this state, the second pump 28 sends the cleaning liquid to the cleaning nozzles (first nozzles) 36. The cleaning nozzles 36 spray cleaning liquid toward contact portions between the clamper 32a, the seating pins 34 or the positioning pins 35, and the object 3. Thereby, before the object 3 is placed on the cleaning table 31, the object 3 and the seating pins 34 or the positioning pins 35 are pre-cleaned.

At the same time, the compressed air supply source 89 supplies the compressed air to the seating detection nozzle 33 via the air flow path 37e. The compressed air sprayed from the seating detection nozzle (third nozzle) 33 blows the periphery of the contact portion between the object 3 and the seating detection nozzle 33. Thereby, the foreign matter attached to the portion where the object 3 is in contact with the seating detection nozzle 33 is blown off. When the pre-cleaning and blowing for the object 3 are completed, the robot moving device 91 provides the object 3 on the cleaning table 31. The compressed air from the compressed air supply source 89 is supplied to the clamping device 32 to clamp the object 3. Thereby, the pre-cleaning of the cleaning table 31 and the object 3 is completed (S24). Then, the loading shutter (not shown) closes the loading port (not shown).

When the cleaning machine 10 is started, the process is restarted from operation S1, the cleaned object 3 is transported to the transport station 95, and the newly loaded object 3 is transported to the cleaning station 97.

The cleaning machine 10 according to the above embodiment has the following beneficial effects.

Since the posture changing device 30 is arranged on the turn table 82, the periphery of the turn table 82 can be easily constructed. In addition, since the compressed air can be supplied to the cleaning table 31 via the flow paths 5a~5e, the guide of the compressed air can be simplified. Specifically, since the flow paths 5a~5e are formed inside the input/output shaft of the reducer 50, it is possible to reduce pipes and the like for supplying the compressed air. Furthermore, a rotation radius of the turn table 82 can be reduced by the inclined surface 45a of the case 45. Therefore, the turn table 82 can be downsized.

In addition, it is configured to be able to supply the cleaning liquid to the cleaning table 31 via the flow path 6, and the cleaning liquid is sprayed from the cleaning nozzles 36 toward the contact portions between the clamper 32a, the seating pins 34 or the positioning pins 35, and the object 3. Thus, when the object 3 is to be provided on the cleaning table 31, the contact portions of the surface of the object 3 contacting with the clamper 32a, the seating pins 34, or the positioning pins 35 are cleaned. When the object 3 is provided on the cleaning table 31, the clamper 32a, the seating pins 34, or the positioning pins 35 are free from dirt. In addition, it is possible to prevent the object 3 from damaging due to the foreign matter attached to the object 3 when the object 3 is clamped to the cleaning table 31. Furthermore, since the flow path 6 is formed inside the shaft of the tail stock 70, it is possible to simplify the guide of the cleaning liquid, and it is possible to reduce the pipes for supplying the cleaning liquid, and the like.

The present disclosure is not limited to the foregoing embodiments, and various modifications can be made without departing from the scope of the present disclosure. Technical matters included in the technical idea described in the claims are all objects of the present disclosure. The above-mentioned embodiments show preferred examples, but as a person skilled in the art, various alternatives, corrections, modifications, or improvements can be implemented based on the contents disclosed in this specification, all of which are included the technical scope described in the appended claims.

For example, a one-chamber type cleaning machine that does not include the turn table 82 can be implemented. For example, a cleaning machine including a posture changing device 30, a nozzle 15, a nozzle moving device 14 and a cleaning chamber 19 can be considered. In such a modified example, the turn table 82 and the partition wall 93 are not arranged.

In addition, instead of the robot moving device 91, the gripper 92, and the fixed blower 85, a robot having a blowing nozzle 85a may be arranged in the cleaning chamber 19. The robot can move the blowing nozzle 85a along the surface of the object 3 while directing the blowing nozzle 85a toward the object 3 so as to dry the object 3.

What is claimed is:

1. A cleaning machine for cleaning an object, comprising:
   a turn table which rotates around a rotation axis so as to turn the object to a predetermined position; and
   a posture changing device arranged on the turn table to change a posture of the object, including:
     a cleaning table on which the object is placed;
     a rotation mechanism arranged on one end of the cleaning table so as to make the cleaning table rotate around a table rotation axis orthogonal to the rotation axis, the rotation mechanism including:
       a motor configured to serve as a driving source,
       a first bevel gear fixed to a driving shaft of the motor,
       a reducer having:
         a hollow output shaft arranged on the same axis as the table rotation axis, and
         a hollow input shaft arranged inside the output shaft,
       a second bevel gear fixed to the input shaft and engaged with the first bevel gear,
       a hollow first swivel housing which is inserted into the input shaft,
       a first swivel shaft arranged to be rotatable around the table rotation axis inside the first swivel housing, and
       a first flange, one end surface of which is fixed to the first swivel shaft and the output shaft, and the other end surface of which is fixed to one end of the cleaning table; and
     at least one first flow path for supplying a first fluid to the cleaning table, including:
       a first annular path formed in an annular shape between the first swivel shaft and an inner peripheral surface of the first swivel housing,
       a first upstream flow path arranged upstream of the first annular path, and
       a first downstream flow path which is arranged downstream of the first annular path and located inside the first swivel shaft, and is connected to the first upstream flow path via the first annular path,
     the cleaning machine further including a compressed air supply source for supplying compressed air that serves as the first fluid to the at least one first flow path,
     the cleaning table further including:
       a plurality of seating pins for seating the object;
       a clamping device for holding the object seated at the plurality of seating pins; and
       a first air flow path which connects the clamping device to one of the at least one first flow path, wherein the clamping device is operated by the compressed air supplied to the first air flow path from the compressed air supply source via the first flow path.

2. The cleaning machine according to claim 1, further comprising:
   a seating detection nozzle for detecting whether the object is seating at the plurality of seating pins; and
   a second air flow path which connects the seating detection nozzle to another of the at least one first flow path.

3. The cleaning machine according to claim 2, further comprising:
   a tail stock which is arranged at another end of the cleaning table and supports said another end of the cleaning table, the tail stock including:
     a bracket fixed on the turn table,
     a second swivel housing which is fixed to the bracket and is arranged on the same axis as the table rotation axis,
     a second swivel shaft which is rotatably arranged in the second swivel housing, and
     a second flange, one end surface of which is fixed to the second swivel shaft, and the other end surface of which is fixed to the other end of the cleaning table; and
   a second flow path for supplying a second fluid to the cleaning table including:
     a second annular path formed in a annular shape between the second swivel shaft and an inner peripheral surface of the second swivel housing,
     a second upstream flow path arranged upstream of the second annular path, and
     a second downstream flow path which is arranged downstream of the second annular path and located inside the second swivel shaft, and is connected to the second upstream flow path via the second annular path.

4. The cleaning machine according to claim 3, wherein the cleaning machine further comprises a cleaning liquid supply source for supplying cleaning liquid that serves as the second fluid to the second flow path, the cleaning table further including:
   at least one cleaning nozzle configured to spray the cleaning liquid on the object; and
   at least one cleaning fluid flow path for connecting the at least one cleaning nozzle to the second flow path.

5. The cleaning machine according to claim 4, wherein the cleaning table includes a first side plate, a second side plate, and a bottom plate which connects a lower part of the first side plate and a lower part of the second side plate,
   the first side plate is fixed to the first flange, and
   the second side plate is fixed to the second flange.

6. The cleaning machine according to claim 5, wherein an opening is formed at the center of the bottom plate,
   the plurality of seating pins, the clamping device, the seating detection nozzle, and the at least one cleaning nozzle are respectively arranged around the opening of the bottom plate, and
   the cleaning nozzle is arranged in proximity to the seating pins.

7. The cleaning machine according to claim 1, wherein the rotation mechanism further includes a box-shaped case configured to cover the motor, the first bevel gear, the second bevel gear, and the reducer, wherein a portion of the case configured to cover the first bevel gear and the second bevel gear is comprised of an inclined surface.

8. A cleaning machine for cleaning an object, comprising a posture changing device for changing a posture of the object, the posture changing device including:
   a cleaning table on which the object is placed;
   a rotation mechanism which is arranged on one end of the cleaning table and causes the cleaning table to rotate around a table rotating axis; and
   at least one first flow path configured to supply a first fluid to the cleaning table, the rotating mechanism including:
   a motor configured to serve as a driving source;
   a first bevel gear fixed to a driving shaft of the motor;
   a reducer including:
     a hollow output shaft arranged on the same axis as the table rotation axis, and a hollow input shaft arranged inside the output shaft;
a second bevel gear fixed to the input shaft and engaged with the first bevel gear;
a hollow first swivel housing which is inserted into the input shaft;
a first swivel shaft arranged to be rotatable around the table rotation axis inside the first swivel housing; and
a first flange, one end surface of which is fixed to the first swivel shaft and the output shaft, and the other end surface of which is fixed to one end of the cleaning table, the at least one first flow path including:
a first annular path formed in an annular shape between the first swivel shaft and an inner peripheral surface of the first swivel housing;
a first upstream flow path which is arranged upstream of the first annular path; and
a first downstream flow path which is arranged downstream of the first annular path and located inside the first swivel shaft, and is connected to the first upstream flow path via the first annular path,
the cleaning machine further including a compressed air supply source for supplying compressed air that serves as the first fluid to the at least one first flow path,
the cleaning table further including:
a plurality of seating pins for seating the object;
a clamping device for holding the object seated at the plurality of seating pins; and
a first air flow path which connects the clamping device to one of the at least one first flow path, wherein the clamping device is operated by the compressed air supplied to the first air flow path from the compressed air supply source via the first flow path.

9. The cleaning machine according to claim 8, further comprising:
a seating detection nozzle for detecting whether the object is seating at the plurality of seating pins; and
a second air flow path which connects the seating detection nozzle to another of the at least one first flow path.

* * * * *